US012350723B2

(12) United States Patent
O'Reilly

(10) Patent No.: US 12,350,723 B2
(45) Date of Patent: Jul. 8, 2025

(54) SYSTEMS, METHODS, AND KITS FOR TREATING ONE OR MORE SURFACES WITH A LIQUID

(71) Applicant: Sanisafe Transportation Solutions, LLC, Denton, TX (US)

(72) Inventor: Mark M. O'Reilly, Roswell, GA (US)

(73) Assignee: Sanisafe Transportation Solutions, LLC, Denton, TX (US)

( * ) Notice: Subject to any disclaimer, the term of this patent is extended or adjusted under 35 U.S.C. 154(b) by 0 days.

(21) Appl. No.: 15/734,872

(22) PCT Filed: Jun. 7, 2019

(86) PCT No.: PCT/US2019/035953
§ 371 (c)(1),
(2) Date: Dec. 3, 2020

(87) PCT Pub. No.: WO2019/236944
PCT Pub. Date: Dec. 12, 2019

(65) Prior Publication Data

US 2021/0237130 A1 Aug. 5, 2021

Related U.S. Application Data

(60) Provisional application No. 62/763,219, filed on Jun. 7, 2018.

(51) Int. Cl.
*B08B 9/093* (2006.01)

(52) U.S. Cl.
CPC .................................... *B08B 9/093* (2013.01)

(58) Field of Classification Search
None
See application file for complete search history.

(56) References Cited

U.S. PATENT DOCUMENTS

| | | | | | |
|---|---|---|---|---|---|
| 1,624,865 | A * | 4/1927 | Freel | B08B 9/0936 | 134/167 R |
| 2,045,752 | A * | 6/1936 | Butterworth | B08B 9/0933 | 134/41 |
| 3,436,263 | A * | 4/1969 | Strenker et al. | B08B 3/08 | 134/40 |

(Continued)

FOREIGN PATENT DOCUMENTS

| | | | |
|---|---|---|---|
| DE | 19514100 | A1 | 10/1996 |
| EP | 2529847 | A1 | 12/2012 |

(Continued)

OTHER PUBLICATIONS

PCT International Search Report and Written Opinion for PCT Application No. PCT/US2019/035953 mailed Oct. 10, 2019 (12 pages).

*Primary Examiner* — Eric W Golightly
*Assistant Examiner* — Arlyn I Rivera-Cordero
(74) *Attorney, Agent, or Firm* — Eversheds Sutherland (US) LLP

(57) ABSTRACT

Systems, methods, and kits for treating one or more surfaces with a liquid. The one or more surfaces may be those of a container, such as a container used to ship food. The systems may include one or more ducts, one or more liquid ejectors, and one or more duct connectors, which may be connected, in any sequence, to form a system.

17 Claims, 12 Drawing Sheets

(56) References Cited

U.S. PATENT DOCUMENTS

| | | | | |
|---|---|---|---|---|
| 8,839,810 | B1 * | 9/2014 | Ellis | B05B 15/68 134/103.3 |
| 2002/0134141 | A1 * | 9/2002 | Walker | G01N 15/0618 73/60.11 |
| 2012/0067372 | A1 * | 3/2012 | O'Quinn | B08B 9/093 134/10 |
| 2013/0019906 | A1 | 1/2013 | Parlow, II | |
| 2016/0175902 | A1 | 6/2016 | Spekschate | |
| 2017/0173617 | A1 * | 6/2017 | Zilai | B08B 9/093 |

FOREIGN PATENT DOCUMENTS

| | | | | |
|---|---|---|---|---|
| WO | WO-2005053865 | A1 * | 6/2005 | B08B 9/093 |
| WO | WO-2013048252 | A2 * | 4/2013 | B08B 9/08 |

* cited by examiner

SYSTEMS, METHODS, AND KITS FOR TREATING ONE OR MORE SURFACES WITH A LIQUID

CROSS-REFERENCE TO RELATED APPLICATIONS

This application is a U.S. national phase application of international application no. PCT/US2019/035953, filed Jun. 7, 2019, which claims priority to U.S. Provisional Patent Application No. 62/763,219, filed Jun. 7, 2018. The content of these applications is incorporated herein by reference.

BACKGROUND

Most, if not all, of the food supply in the US and across the world is delivered in refrigerated or non-refrigerated (e.g., dry) rail, road, or ocean containers. Throughout the food supply chain—from the source growers to the end retailer or consumer—the movement of food typically relies on containers utilized on or in roads, rails, waterways (e.g., rivers, oceans, etc.), or the air (such as air-freight containers, conex containers, etc.) for the delivery of perishable and safe food.

Food transported in most, if not all, modes of refrigerated and non-refrigerated containers can be subject to exposure to microbial contamination, including microbes such as bacteria, mold, and the like remaining from previous use. For example, residual microbes may be present on all or a portion of interior surfaces of containers, including walls, floors, ceilings, air chutes, doors, door seals, air vents, cooling system coils, and/or other surfaces that constitute a container's structure.

There remains a need for systems and methods for eliminating microbes or reducing microbial levels in containers.

BRIEF SUMMARY

Provided herein are systems, kits, and methods for treating one or more surfaces of containers in order to eliminate or reduce microbes such as bacteria. In some embodiments, the systems provided herein include atomizing spray nozzles intermittently arranged in the systems for the purpose of dispending a liquid such as an antimicrobial solution or a detergent solution onto all or a portion of the one or more surfaces of the containers. The systems, methods, and kits herein may eliminate or reduce the likelihood of cross contamination from previous loads stored and/or shipped in a container. The systems, kits, and methods also may allow the status of a system, such as whether one or more surfaces have been treated after a previous use, to be determined and/or inputted, thereby permitting multiple users of a container to ensure, in some embodiments, that the one or more surfaces are treated between uses of a container.

In one aspect, systems for treating one or more surfaces are provided. In some embodiments, the systems include one or more ducts, and one or more liquid ejectors.

The one or more ducts may include (i) a reservoir lumen, and (ii) a utility lumen; wherein the reservoir lumen is configured to retain a liquid, and the reservoir lumen includes a first port configured to permit the liquid to enter or exit the reservoir lumen, and a second port configured to permit the liquid to enter or exit the reservoir lumen; wherein the utility lumen is configured to house at least one of (1) an electrical conduit, or (2) a hose configured to retain a pressurized gas.

The one or more liquid ejectors may include (a) a housing, and (b) a nozzle arranged in the housing, wherein the nozzle is configured to eject the liquid onto at least a portion of the one or more surfaces in response to a signal from the electrical conduit, a pressure provided by the pressurized gas, or a combination thereof; wherein the housing of the one or more liquid ejectors includes a third port configured to permit the liquid to enter or exit the housing, and a fourth port configured to permit the liquid to enter or exit the housing, wherein the housing is in fluid communication with the one or more ducts via a connection between the first port and the fourth port, or a connection between the second port and the third port.

In some embodiments, the systems also include a duct connector. The duct connector may include (i) a reservoir configured to retain the liquid; (ii) a gas inlet configured to permit the introduction of the pressurized gas to the system; and (iii) a fifth port and a sixth port, each configured to permit the liquid to enter or exit the reservoir; wherein the duct connector is in fluid communication with (a) two of the one or more ducts via a connection between the first port of a first duct and the sixth port, and a connection between the second port of a second duct and the fifth port, (b) two of the one or more liquid ejectors via a connection between the third port of a first liquid ejector and the sixth port, and a connection between the fourth port of a second liquid ejector and the fifth port, (c) the first duct and the second liquid ejector via a connection between the first port of the first duct and the sixth port, and a connection between the fourth port of the second liquid ejector and the fifth port, or (d) the second duct and the first liquid ejector via a connection between the second port of the second duct and the fifth port, and a connection between the third port of a first liquid ejector and the sixth port.

In some embodiments, the systems include one or more ducts which include (i) a first reservoir lumen, (ii) a first utility lumen (iii) a first electrical conduit arranged in the first utility lumen, and (iv) a first hose arranged in the first utility lumen; one or more liquid ejectors that include (a) a housing, (b) a nozzle arranged in the housing, (c) a second reservoir lumen, (d) a second utility lumen, (e) a second electrical conduit arranged in the second utility lumen, and (f) a second hose arranged in the second utility lumen, wherein the nozzle is configured to eject a liquid onto at least a portion of the one or more surfaces in response to a signal from the second electrical conduit, a pressure provided by a pressurized gas in the second hose, or a combination thereof; and a duct connector that includes (1) a third reservoir lumen, (2) a third utility lumen, (3) a third electrical conduit arranged in the third utility lumen, (4) a third hose arranged in the third utility lumen, (5) a gas inlet, (6) a supply hose arranged in the gas inlet and connected to the third hose, (7) a fifth port configured to permit a liquid to enter or exit the reservoir, and (8) a sixth port configured to permit a liquid to enter or exit the reservoir, wherein the first reservoir lumen, the second reservoir lumen, and the third reservoir lumen are in fluid communication with each other, the first hose, the second hose, and the third hose are in fluid communication with each other, and the first electrical conduit, the second electrical conduit, and the third electrical conduit are in electrical contact with each other.

In another aspect, kits of parts are provided. In some embodiments, the kits of parts include one or more ducts; one or more liquid ejectors; and one or more duct connectors. In some embodiments, the kits of parts also include a computer processor, and a communication device. The computer processor may be configured to (i) activate the nozzle of the one or more liquid ejectors, (ii) store data, or (iii) a combination thereof, and the communication device may be configured to (i) receive instructions from an input device, (ii) provide instructions to the computer processor, (iii) communicate a status to an input device or a scanning device, (iv) communicate the status to a cloud-based service, or (v) a combination thereof.

In yet another aspect, methods of treating one or more surfaces are provided. In some embodiments, the methods include providing a system for treating one or more surfaces as described herein; and activating the nozzle(s) of the one or more liquid ejectors to eject at least a portion of the liquid onto at least a portion of the one or more surfaces. The nozzle(s) may be activated with (i) a signal from the electrical conduit, (ii) the pressurized gas, or (iii) a combination thereof. The nozzle(s) may be activated by providing instructions with an input device to a communication device, which forwards the instructions to a computer processor.

In some embodiments, the methods also include querying the status of the system prior to the activating of the nozzle(s) of the one or more liquid ejectors. The querying may include receiving with an input device or a scanning device a communication regarding the status of the system from a computer processor via a communication device, a cloud-based service, or a combination thereof.

Additional aspects will be set forth in part in the description which follows, and in part will be obvious from the description, or may be learned by practice of the aspects described herein. The advantages described herein will be realized and attained by means of the elements and combinations particularly pointed out in the appended claims. It is to be understood that both the foregoing general description and the following detailed description are exemplary and explanatory only and are not restrictive.

DETAILED DESCRIPTION

Provided herein are systems that may include at least one duct connector, one or more ducts, and one or more liquid ejectors. The at least one duct connector, one or more ducts, and one or more liquid ejectors may be in fluid communication, such as through a reservoir lumen. Two components are in "fluid communication" with each other when they are directly attached to each other (e.g., a duct and a liquid ejector) or indirectly attached to each other (two liquid ejectors connected at opposite ends of a duct) in a manner that permits a fluid (e.g., a liquid or gas) to be transported between the two components.

The at least one duct connector, one or more ducts, and one or more liquid ejectors generally may be arranged in any sequence in a system and/or have any dimensions (e.g., length, cross-sectional area of a reservoir lumen, utility lumen, etc., etc.). A sequence and/or the dimensions may be selected so that the one or more liquid ejectors are in position(s) to effectively treat one or more surfaces. The connections between the components of the systems may be air-tight, liquid-tight, or a combination thereof.

Figure 1A:
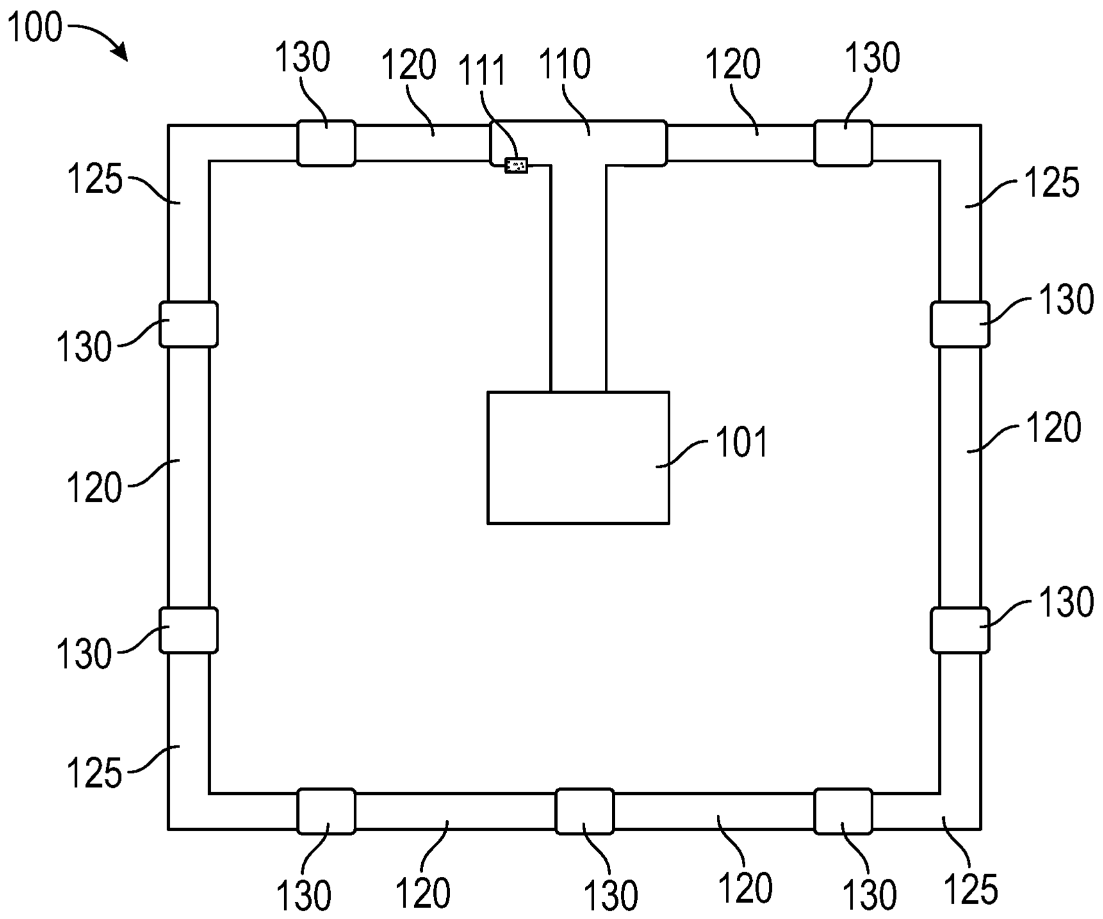
FIG. 1A depicts an embodiment of a system provided herein.

An embodiment of a system provided herein is depicted at FIG. 1A. The system 100 of FIG. 1A includes a pressurized gas supply 101, which may provide pressurized air to the system 100. The pressurized gas supply 101 is in fluid communication with a duct connector 110. The duct connector 110, ducts (120, 125), and liquid ejectors (130) are in fluid communication with other, thereby permitting a liquid introduced into the filling port 111 to fill the system 100. The ducts include straight ducts 120 and bent ducts 125, which are configured for placement in a corner.

Figure 1B:
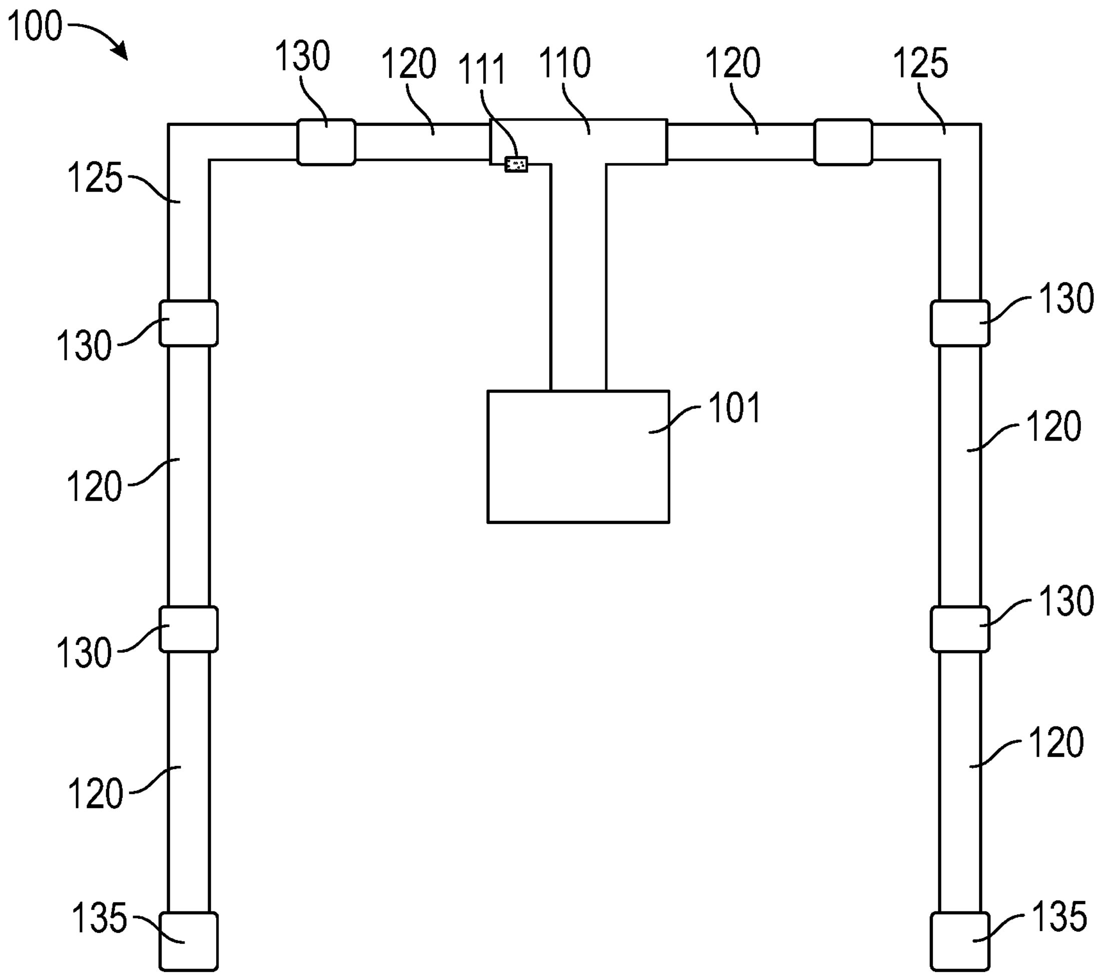
FIG. 1B depicts an embodiment of a system provided herein.

An embodiment of a system provided herein is depicted at FIG. 1B. The system 100 of FIG. 1B includes a pressurized gas supply 101, which may provide pressurized air to the system 100. The pressurized gas supply 101 is in fluid communication with a duct connector 110. The duct connector 110, ducts (120, 125), and liquid ejectors (130, 135) are in fluid communication with other, thereby permitting a liquid introduced into the filling port 111 to fill the system 100. The ducts include straight ducts 120 and bent ducts 125, which are configured for placement in a corner. The terminal liquid ejectors 135 may have one or more ports only on the sides of the terminal liquid ejectors 135 that are connected to a duct 120. In other words, the terminal liquid ejectors 135 may be configured to be placed at a terminal position of the system 100. Alternatively, the one or more ports of the terminal liquid ejectors 120 that are not connected to a duct 120 may be sealed.

Figure 1C:
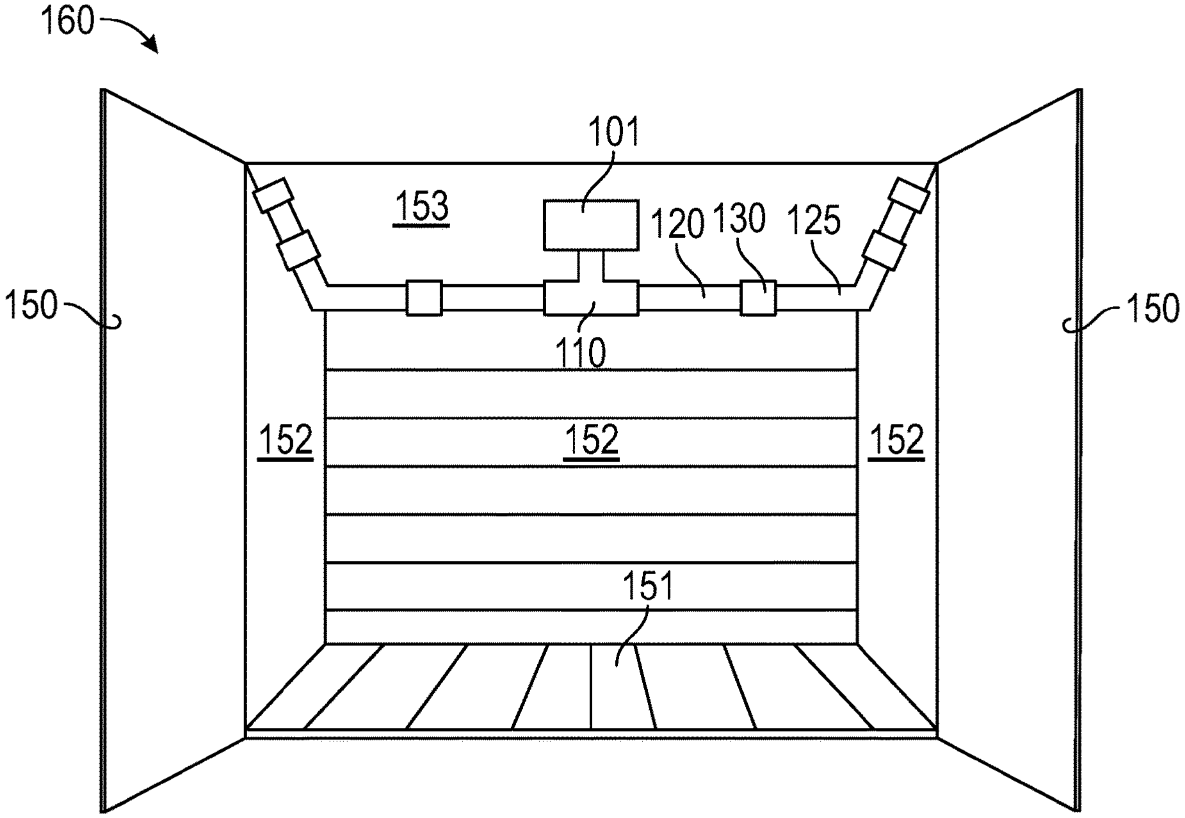
FIG. 1C depicts an embodiment of a container that includes the embodiment of a system depicted at FIG. 1B.

An embodiment of a container 160 that includes the system of FIG. 1B is depicted at FIG. 1C. The pressurized gas supply 101 is affixed to the ceiling 153 of the container 160. The duct connector 110, ducts (120, 125), and liquid ejectors 130 are arranged in the corners formed by the ceiling 153 of the container 160 and at least one of the walls 152 of the container 160. The liquid ejectors 130 of FIG. 1C are dispersed throughout the system in order to eject a liquid onto all or a portion of the walls 152, ceiling 153, and inner surfaces of the doors 150 of the container 160. Although the components of the system of FIG. 1B are affixed to the ceiling and/or walls of the container 160, all or a portion of the components, in other embodiments, may be embedded, completely or partially, in the walls and/or ceilings of a container; or affixed or placed on a ledge at least partially circumventing the walls of a container. Although the components of the system of FIG. 1C are arranged at or near the ceiling of the container 160, other arrangements are envisioned. For example, the ducts and/or liquid ejectors may be located at any distance from the ceiling that permits one or more surfaces to be treated.

Ducts

The systems and kits provided herein may include one or more ducts. Within the systems provided herein, a first duct may be connected to any other component of the systems provided herein. A first duct may be connected to a second duct, a third duct, a duct connector, a first liquid ejector, a second liquid ejector, or a combination thereof. For example, a first duct may be connected to a second duct and a third duct, a second duct and a first liquid ejector, a first liquid ejector and a second liquid ejector, a second duct and a duct connector, a duct connector and a first liquid ejector, etc.

The one or more ducts may include (i) a reservoir lumen, and (ii) a utility lumen. In some embodiments, the one or more ducts include at least one additional lumen. In some embodiments, a lumen, such as a utility lumen, includes two lumens, each hosting a component of the systems.

In some embodiments, the reservoir lumen of a duct is configured to retain a liquid, such as a liquid that includes an antimicrobial agent. A lumen "is configured to retain a liquid" when it is capable of receiving a liquid and/or storing a liquid prior to its ejection from a system.

In some embodiments, the reservoir lumen of a duct includes a first port configured to permit a liquid to enter or exit the reservoir lumen, and a second port configured to permit a liquid to enter or exit the reservoir lumen. In some embodiments, the first port is a male first port, and the second port is a female second port. In some embodiments, the first port is a female first port, and the second port is a male first port. As used herein, the terms "male" and "female" are used to describe elements, such as ports, that are configured to be connected to each other. For example, when two ducts have a first port that is a male first port, and a second port that is a female first port, the two ducts may be connected via the first port of the first duct and the second port of the second duct, thereby placing the reservoir lumens of the two ducts in fluid communication with each other. As a further example, a duct may have a first port that is a male first port that may be connected to a female port of a liquid ejector or a female port of a duct connector.

In some embodiments, a utility lumen of a duct is configured to house at least one of (1) an electrical conduit or (2) a hose configured to retain a pressurized gas. In some embodiments, a duct includes a utility lumen that houses both an electrical conduit and a hose configured to retain a pressurized gas. In some embodiments, a duct includes a first utility lumen that houses an electrical conduit, and a second utility lumen that houses a hose configured to retain a pressurized gas. The phrase "utility lumen", as used herein, includes a single lumen or two or more lumens, such as the first utility lumen and the second utility lumen. A utility lumen, in some embodiments, is arranged at or near an upper portion of a duct; for example, above the maximum level of liquid in a reservoir lumen. Such an arrangement may prevent, or minimize the risk of, a liquid contacting an electrical conduit and/or hose.

The one or more ducts of the systems and kits provided herein generally may be constructed of any one or more materials. In some embodiments, a duct is constructed of a single material. In some embodiments, a duct is constructed of two or more different materials. For example, a first material may define the outer walls of a duct, while a second material may define at least a portion of a reservoir lumen and/or utility lumen. Non-limiting examples of materials of which the one or more ducts may be constructed include metal, wood, plastic, glass, or a combination thereof. In some embodiments, at least one of the one or more ducts may be constructed at least partially of a transparent material, such as a transparent plastic, which may permit an amount of liquid in a system to be determined visually.

The one or more ducts of the systems and kits provided herein generally may have any desired dimensions, including, but not limited to, length, width, total cross-sectional area, cross-sectional area of a reservoir lumen, and cross-sectional area of a utility lumen. A system or kit may include two or more ducts having different dimensions, which may ease the installation of the systems in containers having different dimensions. In some embodiments, the one or more ducts include a duct having a length of about 0.1 meter to about 3 meters, about 0.5 meters to about 2 meters, or about 0.5 meters to about 1.5 meters.

The one or more ducts may include a first end and a second end, and the first end and the second end may be configured as a male end and a female end, or vice versa. The male end and female end may permit (i) two ducts to be connected via a male end and female end, (ii) a duct to be connected to a liquid ejector via a male end and a female end, or (iii) a duct to be connected to a duct connector via a male end and a female end. A male end and a female end of the ducts or other components of the systems provided herein may be configured to connect by any technique known in the art. For example, a male end and a female end may be configured to "snap" together, due, for example, to the presence of corresponding ridges and depressions/openings on the different ends. As a further example, an adhesive may be used to connect a male end and a female end.

Figure 2A:
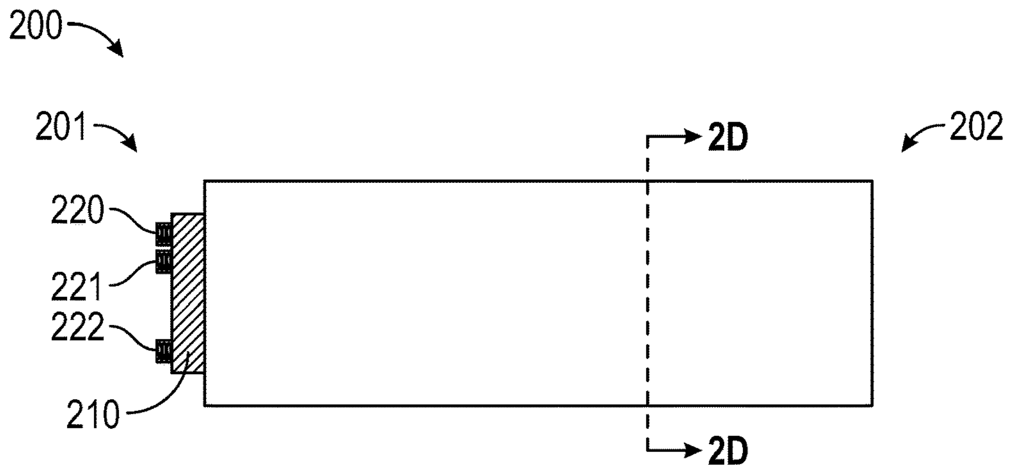
FIG. 2A depicts an embodiment of a duct.
Figure 2B:
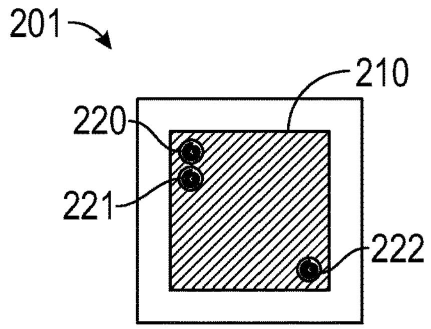
FIG. 2B depicts a side view of the embodiment of the duct of FIG. 2A.
Figure 2C:
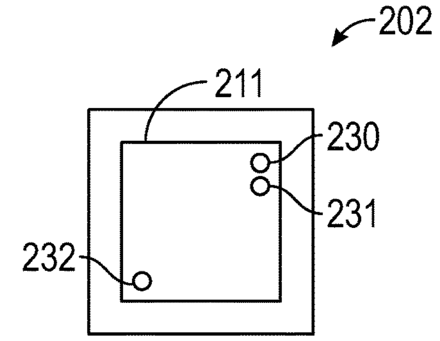
FIG. 2C depicts a side view of the embodiment of the duct of FIG. 2A.
Figure 2D:
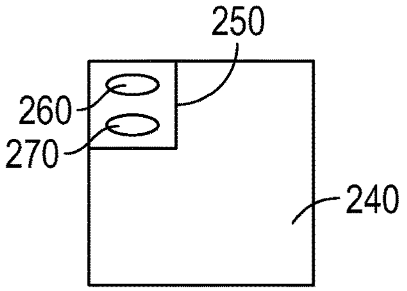
FIG. 2D depicts a cross-sectional view of the embodiment of the duct of FIG. 2A, taken along reference line 2D-2D of FIG. 2A.

An embodiment of a duct 200 is depicted at FIG. 2A, FIG. 2B, FIG. 2C, and FIG. 2D. The duct 200 includes a male end 201 and a female end 202. End views of the male end 201 and female end 202 of the duct 200 are depicted at FIG. 2B and FIG. 2C, respectively. A cross-sectional view of the duct 200 (corresponding to the reference line 2D-2D provided at FIG. 2A) is depicted at FIG. 2D. The male end 201 is configured to be inserted into a female end of a second duct, or another component of the systems provided herein. The male end 201 of the duct 200 includes an extended portion 210 that is configured for insertion into a corresponding recessed portion 211 of the female end 202. The male end 201 of the duct also includes a first male port 222 corresponding to the reservoir lumen 240. The first male port 222 is configured to be connected to the corresponding female port 232 of a second duct, or another component of the systems provided herein. The male end 201 of the duct 200 also includes a male connectors (220, 221) that correspond to the electrical conduit 260 and pressurized air hose 270, which are arranged in a utility lumen 250. The male connectors (220, 221) are configured to be connected to the corresponding female connectors (230, 231) of a second duct or another component of the systems provided herein, thereby permitting electricity and pressurized air to be transported from one component of the systems to another. Although the first male port 222 and male connectors (220, 221) appear on the male end 201 of the duct 200 of FIG. 2A, other configurations are envisioned, including, but not limited to, a configuration in which a first female port and female connectors appear on the male end of a duct.

In embodiments, the connectors used to connect the one or more ducts, one or more liquid ejectors, and duct connector can be of the appropriate "quick-connect" type, to make assembly and installation of the system more convenient. For example, the male connectors (220, 221) and the corresponding female connectors (230, 231) which correspond to the electrical conduit 260 and pressurized air hose 270 can be of the quick-connect type to allow convenient and rapid electrical and pressure connections to be established among the ducts, liquid ejectors and/or duct connector. The male ports, for example the first male port 222 at the male end 201 of the duct corresponding to the reservoir lumen 240 which is configured to be connected to the corresponding female port 232 can also be of the quick connect type which allows fluid communication as disclosed herein.

Generally, the one or more ducts of the systems provided herein, including the reservoir lumens and utility lumens, generally may have any shape. In some embodiments, the one or more ducts include at least one flat external surface. The flat external surface may be arranged on and in contact with a wall of a container or a ceiling of a container. In some embodiments, the one or more ducts include at least two flat external surfaces. The two flat external surfaces may meet at an angle of about 90°, as depicted, for example, at FIG. 2B, FIG. 2C, and FIG. 2D. When a duct has two flat external surfaces, the duct may be arranged in a corner of a container. For example, a duct may be arranged so that one of the flat external surfaces contacts a wall of a container, while the other flat external surface contacts the ceiling of the container. An example of such a configuration is depicted at FIG. 1C.

Although the duct depicted at FIG. 2B, FIG. 2C, and FIG. 2D has a square cross-sectional shape, other shapes are envisioned. Other shapes may be configured to ensure that the liquid is at or near a port when a port is placed at or near the bottom (relative to a side view) of a reservoir lumen.

Figure 3A:
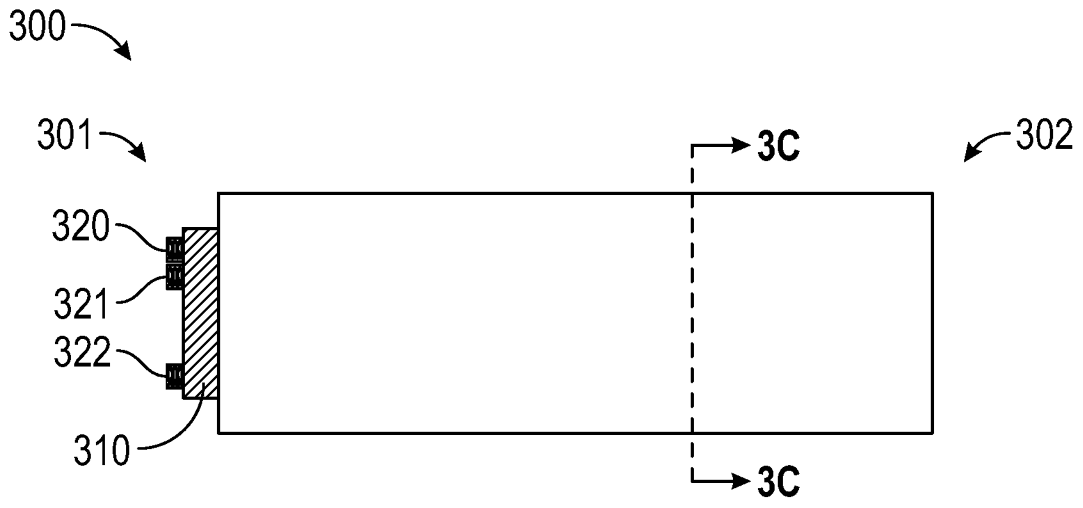
FIG. 3A depicts an embodiment of a duct.
Figure 3B:
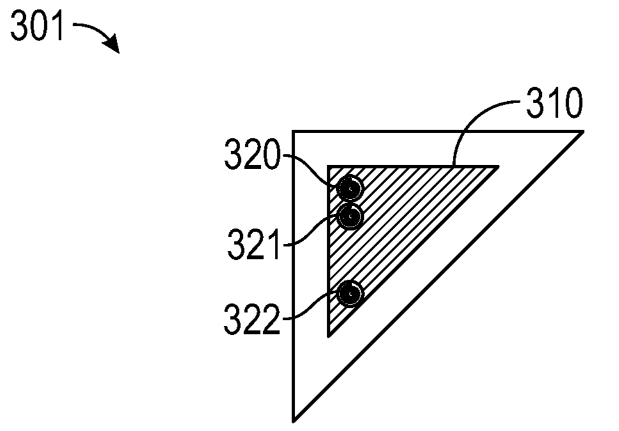
FIG. 3B depicts a side view of the embodiment of the duct of FIG. 3A.
Figure 3C:
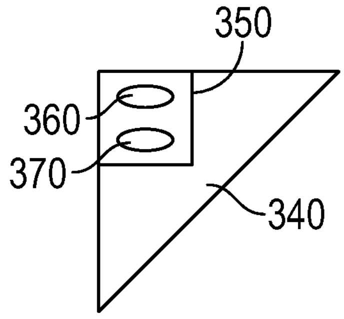
FIG. 3C depicts a cross-sectional view of the embodiment of the duct of FIG. 3A taken along reference line 3C-3C of FIG. 3A.

An embodiment of a duct 300 is depicted at FIG. 3A, FIG. 3B, and FIG. 3C, which has a triangular cross-sectional shape. The duct 300 includes a male end 301 and a female end 302. A side view of the male end 301 of the duct 300 is depicted at FIG. 3B. A cross-sectional view of the duct 300 (corresponding to the reference line 3C-3C provided at FIG. 3A) is depicted at FIG. 3C. The male end 301 is configured to be inserted into a female end of a second duct, or another component of the systems provided herein. The male end 301 of the duct 300 includes an extended portion 310 that is configured for insertion into a corresponding recessed portion of the female end 302. The male end 301 of the duct also includes a first male port 322 corresponding to the reservoir lumen 340. The first male port 322 is configured to be connected to the corresponding female port of a second duct, or another component of the systems provided herein. The male end 301 of the duct 300 also includes male connectors (320, 321) that correspond to the electrical conduit 360 and pressurized air hose 370, which are arranged in a utility lumen 350. The male connectors (320, 321) are configured to be connected to the corresponding female connectors of a second duct or another component of the systems provided herein, thereby permitting electricity and pressurized air to be transported from one component of the systems to another.

Figure 4A:
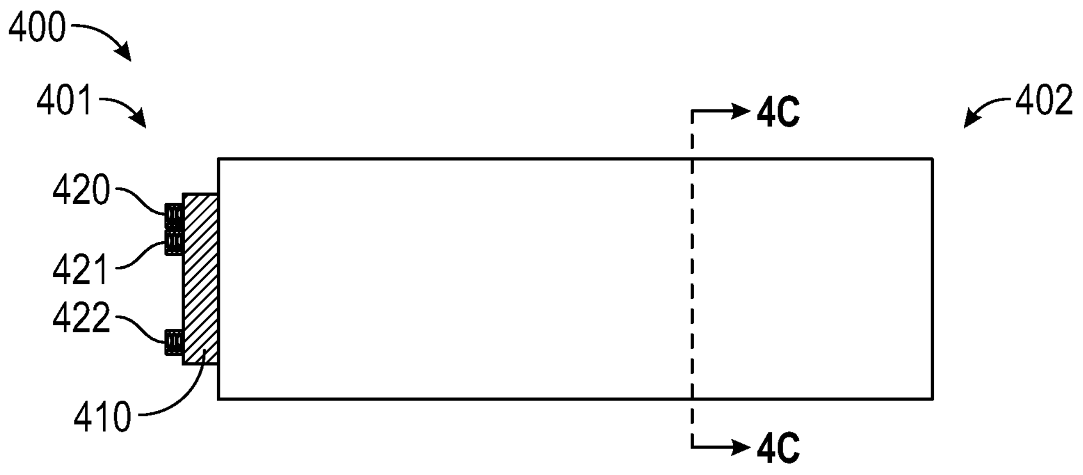
FIG. 4A depicts an embodiment of a duct.
Figure 4B:
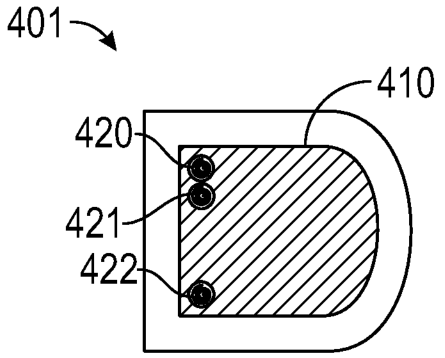
FIG. 4B depicts a side view of the embodiment of the duct of FIG. 4A.
Figure 4C:
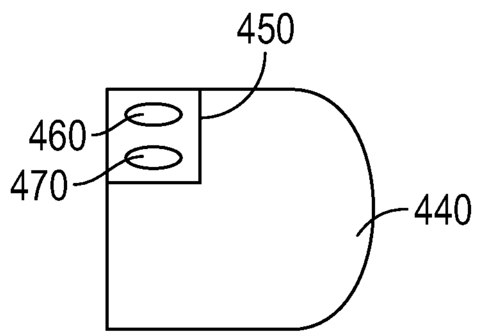
FIG. 4C depicts a cross-sectional view of the embodiment of the duct of FIG. 4A, taken along reference line 4C-4C of FIG. 4A.

An embodiment of a duct 400 is depicted at FIG. 4A, FIG. 4B, and FIG. 4C, which has an irregular cross-sectional shape. The duct 400 includes a male end 401 and a female end 402. A side view of the male end 401 of the duct 400 is depicted at FIG. 4B. A cross-sectional view of the duct 400 (corresponding to the reference line 4C-4C provided at FIG. 4A) is depicted at FIG. 4C. The male end 401 is configured to be inserted into a female end of a second duct, or another component of the systems provided herein. The male end 401 of the duct 400 includes an extended portion 410 that is configured for insertion into a corresponding recessed portion of the female end 402. The male end 401 of the duct also includes a first male port 422 corresponding to the reservoir lumen 440. The first male port 422 is configured to be connected to the corresponding female port of a second duct, or another component of the systems provided herein. The male end 401 of the duct 400 also includes male connectors (420, 421) that correspond to the electrical conduit 460 and pressurized air hose 470, which are arranged in a utility lumen 450. The male connectors (420, 421) are configured to be connected to the corresponding female connectors of a second duct or another component of the systems provided herein, thereby permitting electricity and pressurized air to be transported from one component of the systems to another.

Figure 5:
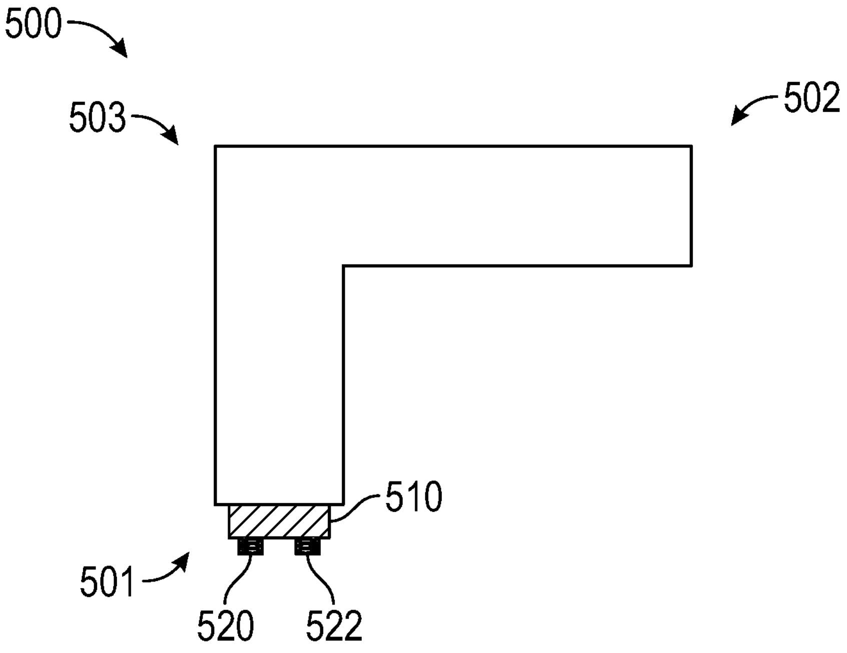
FIG. 5 depicts a top view of an embodiment of a duct.

The one or more ducts of the systems provided herein also may have any external shape or feature (straight, angled, curved, etc.). For example, the one or more ducts may be straight ducts, as depicted at FIG. 2A, FIG. 3A, and FIG. 4A. In some embodiments, the one or more ducts are angled ducts. The angled ducts may be configured to be arranged in a corner of a container that is formed by two walls of the container, or two walls and the ceiling of the container. A top view of an embodiment of an angled duct is depicted at FIG. 5. The angled duct 500 of FIG. 5 includes a portion 503 that is bent at an angle of about 90°. The angled duct 500 includes a male end 501 and a female end 502. The male end 501 includes an extended portion 510, a male connector 520, and a male port 522.

Figure 6A:
FIG. 6A depicts an embodiment of a duct having an angled end.
Figure 6B:
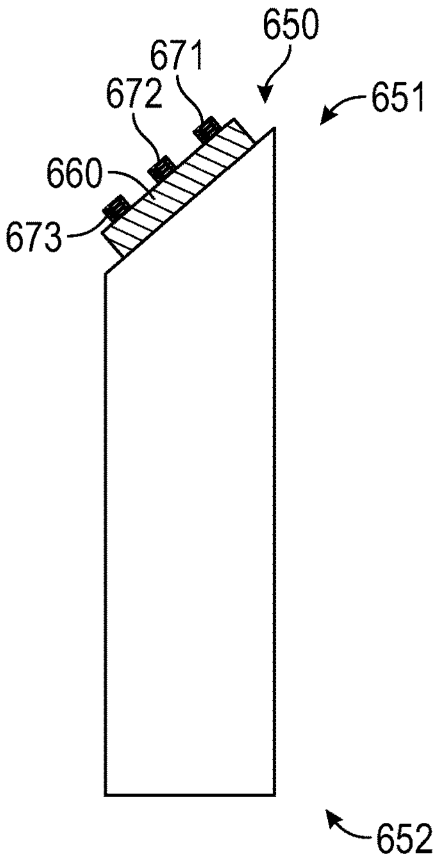
FIG. 6B depicts an embodiment of a duct having an angled end.
Figure 6C:
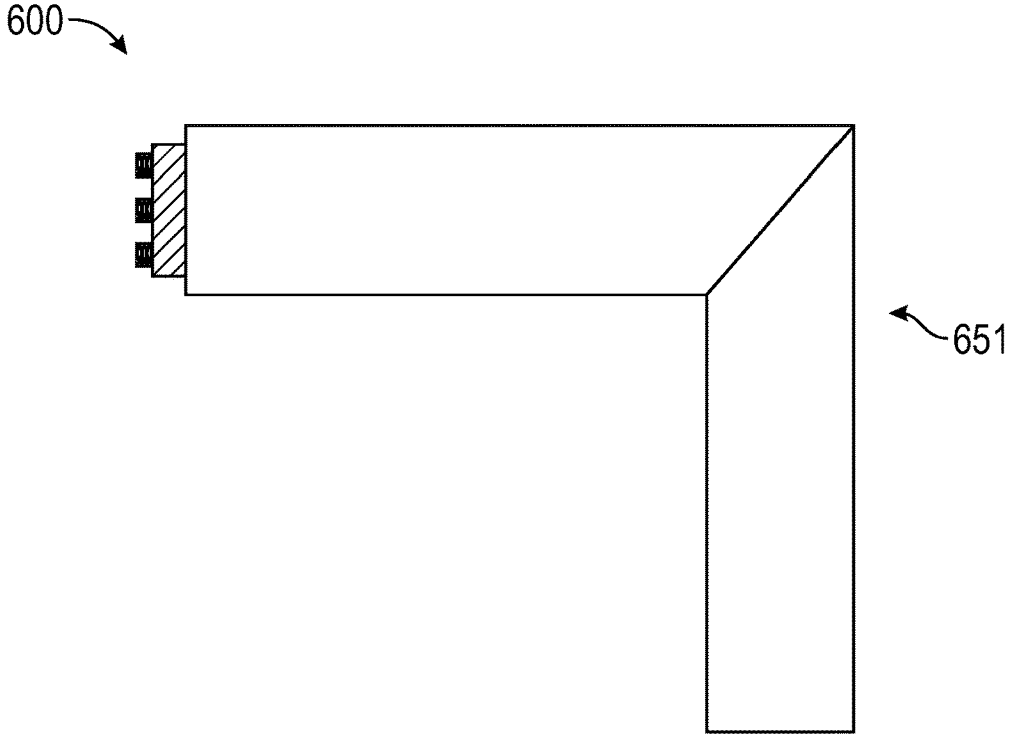
FIG. 6C depicts the ducts of FIG. 6A and FIG. 6B in a connected state.

The one or more ducts of the systems provided herein may include two ducts that are configured to be connected in a corner, such as a corner formed by two walls of a container, or a wall and the ceiling of a container. Embodiments of two ducts that are configured to be connected in a corner are depicted at FIG. 6A and FIG. 6B. The duct 600 depicted at FIG. 6A (top view) has a male end 601 and an angled female end 602. The male end 601 of the duct 600 includes a port 622 corresponding to a liquid lumen, and male connectors (620, 621) that correspond to an electrical conduit and pressurized air hose. The duct 650 depicted at FIG. 6B (top view) has an angled male end 651 and a female end 652. The angled male end 651 of the duct 650 includes a port 673 corresponding to a liquid lumen, and male connectors (671, 672) that correspond to an electrical conduit and pressurized air hose. The duct 600 of FIG. 6A and the duct 650 of FIG. 6B may be connected as depicted at FIG. 6C.

Duct Connectors

The systems and kits provided herein may include one or more duct connectors. In some embodiments, the systems and kits provided herein include one duct connector. Embodiments of systems that include one duct connector are depicted at FIG. 1A and FIG. 1B. In some embodiments, the duct connector is a "T-shaped" junction that connects at least two components (e.g., two ducts) of the systems provided herein.

The one or more duct connectors generally may be configured to introduce one or more elements (e.g., a liquid, a pressurized gas, an electrical conduit, power to an electrical conduit, or a combination thereof) into a system.

The one or more duct connectors may include a reservoir configured to retain a liquid, and a gas inlet configured to permit the introduction of a pressurized gas to a system, a fifth port, and a sixth port, wherein the fifth port and the sixth port are each configured to permit a liquid to enter or exit the reservoir.

The gas inlet of a duct connector may include a channel that hosts a supply hose. A supply hose, for example, may traverse a gas inlet of a duct connector, and be connected to a hose configured to retain a pressurized gas. A duct connector may be arranged at or near a supply of pressurized gas.

The one or more duct connectors may be in fluid communication with (a) two of the one or more ducts via a connection between the first port of a first duct and the sixth port, and a connection between the second port of a second duct and the fifth port, (b) two of the one or more liquid ejectors via a connection between the third port of a first liquid ejector and the sixth port, and a connection the fourth port of a second liquid ejector and the fifth port, (c) the first duct and the second liquid ejector via a connection between the first port of the first duct and the sixth port, and a connection the fourth port of the second liquid ejector and the fifth port, or (d) the second duct and the first liquid ejector via a connection between the second port of the second duct and the fifth port, and a connection between the third port of a first liquid ejector and the sixth port.

The one or more duct connectors may include a first end and a second end, and the first end and the second end may be configured as a male end and a female end, or vice versa. The male end and female end may permit (i) two ducts to be connected to a duct connector via a male end and female end, (ii) a duct connector to be connected to one or two liquid ejectors via a male end and a female end, or (iii) a duct connector to be connected to a duct via a male end and a female end, and a liquid ejector via a male end and a female end. A male end and a female end of the duct connector or other components of the systems provided herein may be configured to connect by any technique known in the art. For example, a male end and a female end may be configured to "snap" together, due, for example, to the presence of corresponding ridges and depressions/openings on the different ends. As a further example, an adhesive may be used to connect a male end and a female end.

The duct connectors of the systems provided herein may include a utility lumen. In some embodiments, a utility lumen of a duct connector is configured to house at least one of (1) an electrical conduit or (2) a hose configured to retain a pressurized gas. In some embodiments, a duct connector includes a utility lumen that houses both an electrical conduit and a hose configured to retain a pressurized gas. In some embodiments, a duct connector includes a first utility lumen that houses an electrical conduit, and a second utility lumen that houses a hose configured to retain a pressurized gas. A utility lumen, in some embodiments, is arranged at or near an upper portion of a duct connector; for example, above the maximum level of liquid in a reservoir lumen. Such an arrangement may prevent, or minimize the risk of, a liquid contacting an electrical conduit and/or hose.

A utility lumen of a duct connector may include one or more access ports. The one or more access ports may permit a component to be connected to an electrical conduit and/or a hose configured to retain a pressurized gas. For example, a supply hose may be inserted into the gas inlet, and the supply hose may be connected to the hose configured to retain a pressurized gas. The hose configured to retain a pressurized gas and the supply hose may be connected by any known technique. The gas provided by a supply hose may be introduced to the supply hose through a compressor. The compressor may be part of a truck or trailer, such as the refrigeration system of a trailer. The compressor may be independent of the truck or trailer. The systems provided herein, therefore, may include a compressor or other apparatus for provide a gas to the supply hose.

The duct connectors of the systems provided herein may include a compartment for housing one or more components of the systems. For example, the duct connectors may include a compartment that houses a computer processor, a communication device, a power source, or a combination thereof. The power source may supply power to an electrical conduit, and the electrical conduit and the power source may be connected via an access port in at least one of the utility lumen of a duct connector and the compartment that houses the power source. The power source may be a battery power source. The battery power source may rely on one or more batteries, including, but not limited to, a 9V battery. When the power source is a battery power source, the systems and kits may include a component configured to indicate a low battery. The component configured to indicate a low battery may be a warning light. The power source may be configured to communicate a status to a computer processor, and the status, in turn, may be communicated to a device (e.g., input device, scanning device, cell phone, tablet, etc.). The power source may be connected to a power supply that is a component of a vehicle or container, e.g., a truck, trailer, etc.

Figure 7A:
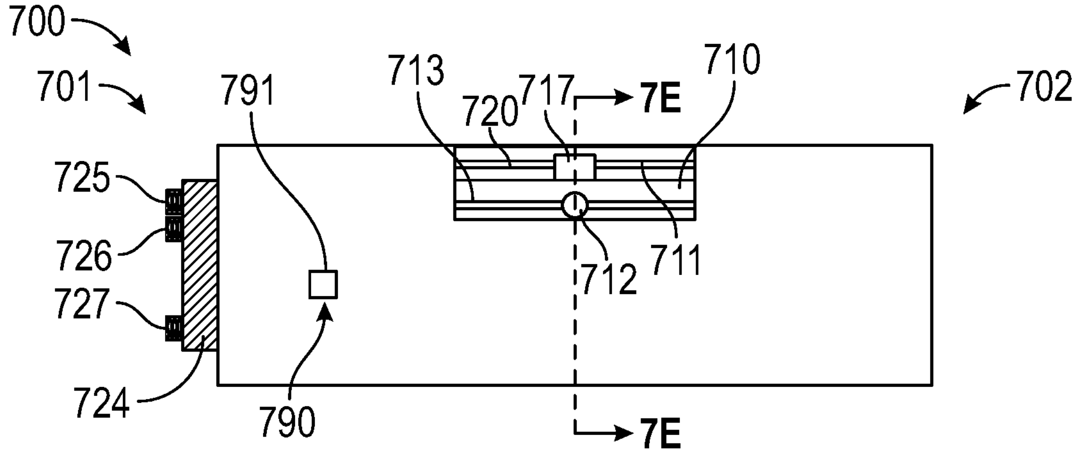
FIG. 7A depicts an embodiment of a duct connector.
Figure 7B:
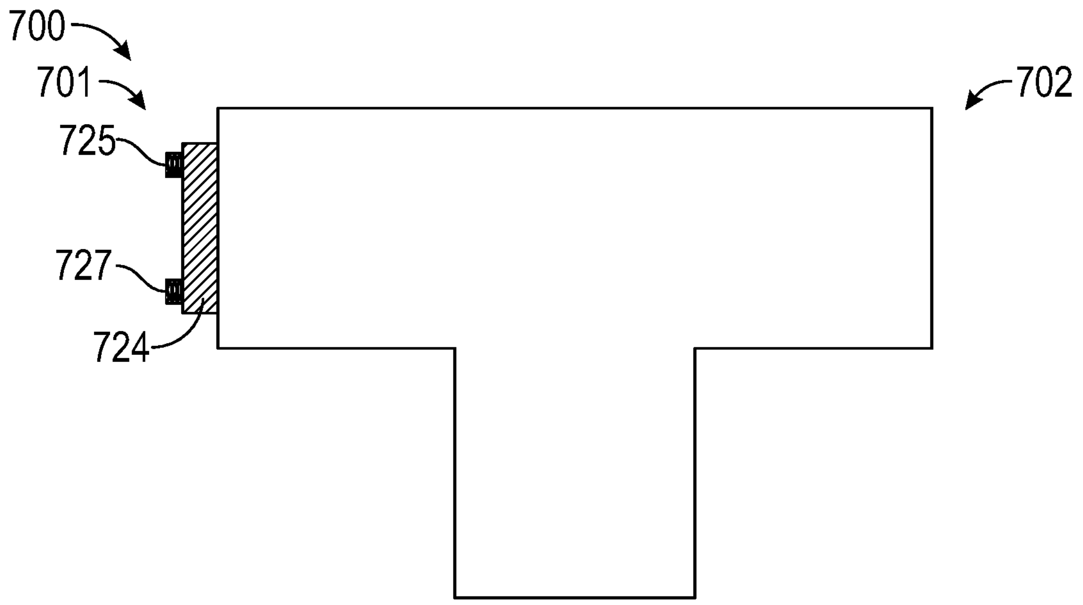
FIG. 7B depicts a top view of the duct connector of FIG. 7A.
Figure 7C:
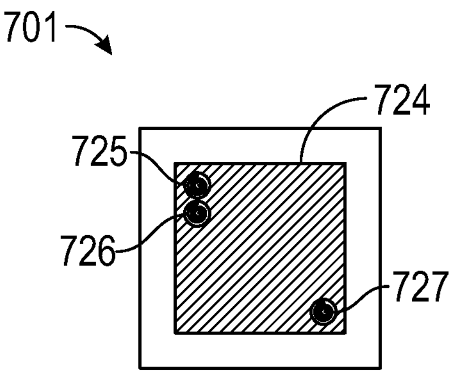
FIG. 7C depicts a side view of a male end of the duct connector of FIG. 7A.
Figure 7D:
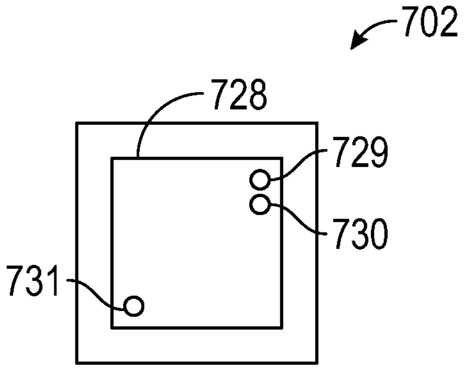
FIG. 7D depicts a side view of a female end of the duct connector of FIG. 7A.
Figure 7E:
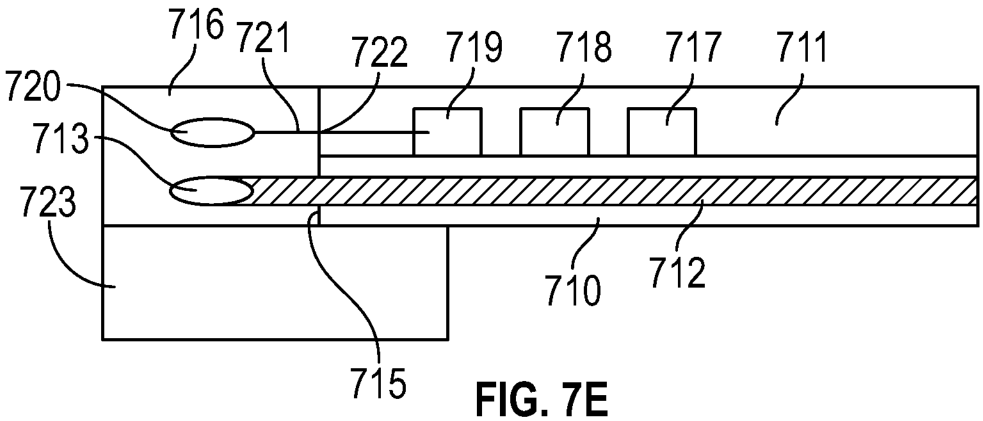
FIG. 7E depicts a cross-sectional view of the duct connector of FIG. 7A, taken along reference line 7E-7E of FIG. 7A.

An embodiment of a duct connector is depicted at FIG. 7A, FIG. 7B (top view), FIG. 7C (end view (male end)), FIG. 7D (end view (female end)), and FIG. 7E (cross-sectional view taken along reference line 7E-7E of FIG. 7A). The duct connector 700 includes gas inlet 710, and a supply hose 712 arranged in the gas inlet 710. The supply hose 712 is connected to a hose 713 configured to retain a pressurized gas. The supply hose 712 traverses a first access port 715 in the utility lumen 716 of the duct connector 700. The supply hose 712 may be connected to a gas supply as described herein. The duct connector 700 also includes a compartment 711 that houses a communication device 717, a computer processor 718, and a power source 719. The power source 719 is connected to an electrical conduit 720 via a cord 721 that traverses a second access port 722 in the utility lumen 716. In some embodiments, the compartment 711 and gas inlet 710 may be sealed completely or partially, however, the embodiment depicted at FIG. 7A-FIG. 7E does not include a sealed compartment 711 or gas inlet 710 so that all components may be seen, where possible, in the different views. The duct connector 700 also includes a reservoir lumen 723. The duct connector 700 also includes a male end 701 and a female end 702. The male end 701 of the duct connector 700 includes a port 727 corresponding to a reservoir lumen 723, and male connectors (725, 726) that correspond to the electrical conduit 720 and pressurized air hose 713. The male end 701 of the duct connector 700 includes an extended portion 724 that is configured for insertion into a corresponding recessed portion of a female end of another component, such as the female end of the embodiment of a duct depicted at FIG. 2A. The female end 702 of the duct connector 700 includes a depressed portion 728 configured to receive the extended portion of a male end of another component of the systems provided here, such as the male end of the embodiment of the duct depicted at FIG. 2A. The female end 701 of the duct connector 700 includes a port 731 corresponding to the reservoir lumen 723, and female connectors (729, 730) that correspond to the electrical conduit 720 and the hose 713 configured to retain a pressurized gas. The duct connector 700 of FIG. 7A also includes a filling port 790. The filling port 790 is sealed with a plug 791.

The one or more duct connectors of the systems and kits provided herein generally may be constructed of any one or more materials. In some embodiments, a duct connector is constructed of a single material. In some embodiments, a duct connector is constructed of two or more different materials. For example, a first material may define the outer walls of a duct connector, while a second material may define at least a portion of a gas inlet, a reservoir lumen, and/or utility lumen. Non-limiting examples of materials of which the one or more duct connectors may be constructed include metal, wood, plastic, glass, or a combination thereof. In some embodiments, a duct connector is constructed at least partially of a transparent material, such as a transparent plastic, which may permit an amount of liquid in a system to be determined visually.

Liquid Ejectors

The systems and kits provided herein may include one or more liquid ejectors. The one or more liquid ejectors of the systems and kits provided herein may include (a) a housing, and (b) a nozzle arranged in the housing. A housing may include one nozzle or more than one nozzle; for example, two nozzles, three nozzles, four nozzles, five nozzles, etc. A system or kit may include two or more liquid ejectors; for example, 2 to 40 liquid ejectors, 2 to 30 liquid ejectors, 2 to 20 liquid ejectors, or 5 to 15 liquid ejectors. An embodiment of a system that includes 9 liquid ejectors is depicted at FIG. 1A, and an embodiment of a system that includes 8 liquid ejectors is depicted at FIG. 1B.

In some embodiments, the one or more liquid ejectors provide an electrostatic or non-electrostatic spray system or fogging system. When the liquid ejectors provide an electrostatic spray system or fogging systems, the nozzle(s) of the one or more liquid ejectors may include nozzles that are commonly referred to in the art as "low pressure/low volume" nozzles.

The one or more nozzles of the liquid ejectors may be configured to eject a liquid onto at least a portion of one or more surfaces in response to a signal from an electrical conduit, a pressure provided by a pressurized gas, or a combination thereof. The signal from the electrical conduit may include a charge. The charge, in some embodiments, is directed to an electrostatic spray or fogging nozzle, or to a non-electrostatic spray or fogging nozzle. The one or more nozzles may be arranged in a housing in a manner that facilitates the treating of all or a portion of one or more surfaces. For example, a nozzle may be arranged at a position of the housing and/or aimed (for example, by angling the nozzle) to eject fluid toward a desired direction and/or at a desired location. As a further example, a housing may have a first side that faces an opposite wall of a container, and a second side that faces a floor of a container; and, in one embodiment, a nozzle is arranged at the first side; in another embodiment, a nozzle is arranged at the second side; and, in yet another embodiment, a first nozzle is arranged at the first side, and a second nozzle is arranged at the second side. The one or more nozzles of the liquid ejectors can include one or more rotating nozzles. In some embodiments, the nozzles may be extended forward during use and retractable following discharge of the liquid.

The one or more liquid ejectors may include (i) a reservoir lumen, and (ii) a utility lumen. In some embodiments, the one or more liquid ejectors include at least one additional lumen.

In some embodiments, the reservoir lumen of a liquid ejector is configured to retain a liquid, such as a liquid that includes an antimicrobial agent. In some embodiments, the reservoir lumen of a liquid ejector includes a first port configured to permit a liquid to enter or exit the reservoir lumen, and a second port configured to permit a liquid to enter or exit the reservoir lumen. In some embodiments, the first port is a male first port, and the second port is a female second port. In some embodiments, the first port is a female first port, and the second port is a male first port.

In some embodiments, a utility lumen of a liquid ejector is configured to house at least one of (1) an electrical conduit or (2) a hose configured to retain a pressurized gas. In some embodiments, a liquid ejector includes a utility lumen that houses both an electrical conduit and a hose configured to retain a pressurized gas. In some embodiments, a liquid ejector includes a first utility lumen that houses an electrical conduit, and a second utility lumen that houses a hose configured to retain a pressurized gas. A utility lumen, in some embodiments, is arranged at or near an upper portion of a liquid ejector; for example, above the maximum level of liquid in a reservoir lumen. Such an arrangement may prevent, or minimize the risk of, a liquid contacting an electrical conduit and/or hose.

The one or more nozzles may include an apparatus configured to activate the one or more nozzles in response to a signal (e.g., power) from an electrical conduit, a pressure provided by a pressurized gas, or a combination thereof. The apparatus may include a spring and one or more electronic components. The apparatus may be connected to the electrical conduit and/or hose configured to retain a pressurized gas by any technique known in the art. In some embodiments, the housing of a liquid ejector includes a nozzle compartment that hosts one or more nozzles, including the apparatus configured to activate the one or more nozzles. The nozzle compartment may include one or more access ports that permits the electrical conduit and/or hose configured to retain a pressured gas to be connected to the nozzle.

The nozzle(s) of the one or more liquid ejectors may be configured to eject the liquid in any form. In some embodiments, the nozzle(s) of the one or more liquid ejectors are configured to eject the liquid in the form of droplets. In some embodiments, the nozzle(s) of the one or more liquid ejectors are configured to eject the liquid in the form of droplets, the droplets having an average droplet size of about 30 microns to about 50 microns. In some embodiments, the nozzle(s) of the one or more liquid ejectors are configured to eject the liquid in the form of droplets, the droplets having an average droplet size of about 40 microns.

Figure 8A:
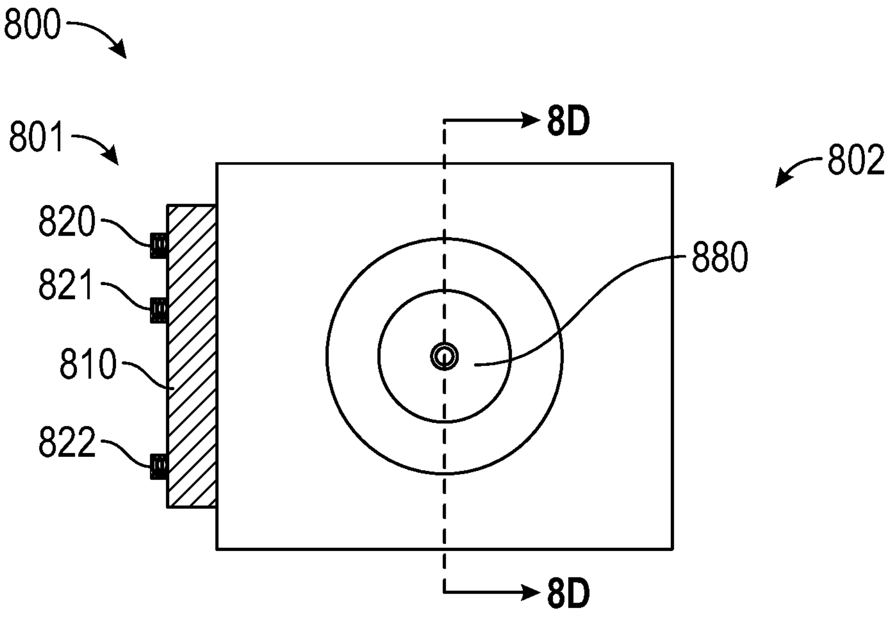
FIG. 8A depicts an embodiment of a liquid ejector.
Figure 8B:
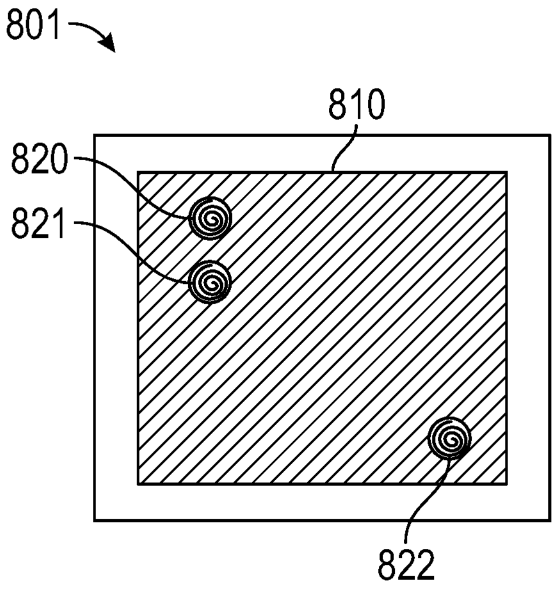
FIG. 8B depicts a side view of the liquid ejector of FIG. 8A.
Figure 8C:
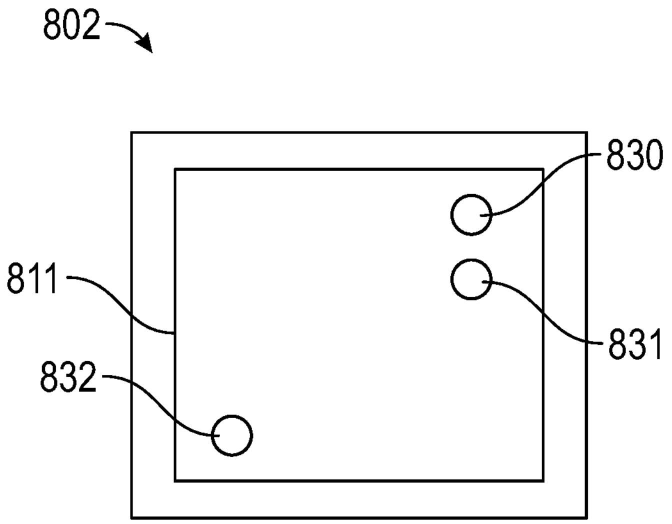
FIG. 8C depicts a side view of the liquid ejector of FIG. 8A.
Figure 8D:
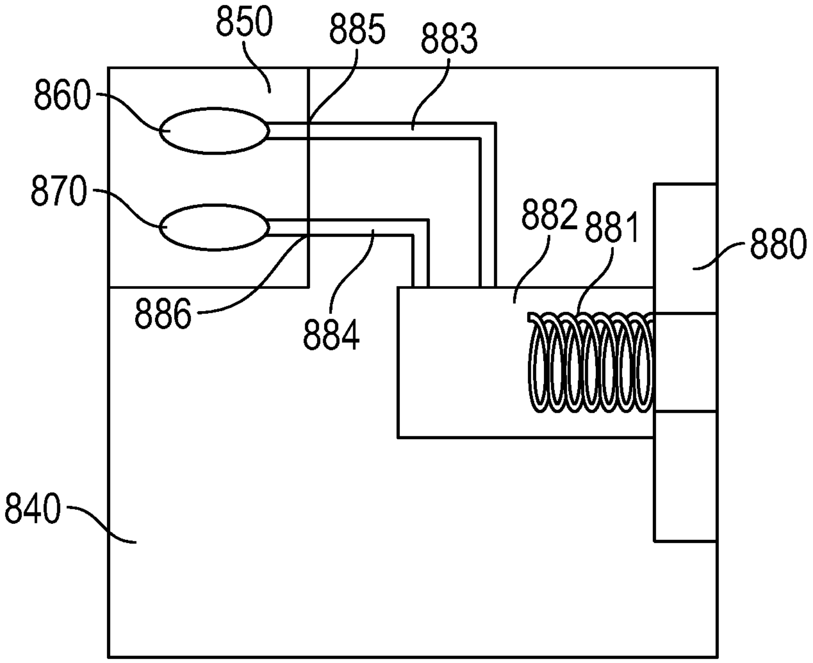
FIG. 8D depicts a cross-sectional view of the liquid ejector of FIG. 8A, taken along reference line 8D-8D of FIG. 8A.

An embodiment of a liquid ejector 800 is depicted at FIG. 8A, FIG. 8B, FIG. 8C, and FIG. 8D. The liquid ejector 800 includes a male end 801 and a female end 802. Side views of the male end 801 and female end 802 of the liquid ejector 800 are depicted at FIG. 8B and FIG. 8C, respectively. A cross-sectional view of the liquid ejector 800 (corresponding to the reference line 8D-8D provided at FIG. 8A) is depicted at FIG. 8D. The male end 801 is configured to be inserted into a female end of a duct or duct connector or another component of the systems provided herein. The male end 801 of the liquid ejector 800 includes an extended portion 810 that is configured for insertion into a corresponding recessed portion of a female end of another component. The male end 801 of the liquid ejector also includes a first male port 822 corresponding to the reservoir lumen 840. The first male port 822 is configured to be connected to a corresponding female port of a duct or duct connector or another component of the systems provided herein. The male end 801 of the liquid ejector 800 also includes a male connectors (820, 821) that correspond to the electrical conduit 860 and pressurized air hose 870, which are arranged in a utility lumen 850. The male connectors (820, 821) are configured to be connected to the corresponding female connectors of a duct or duct connector or another component of the systems provided herein, thereby permitting electricity and pressurized air to be transported from one component of the systems to another. Although the first male port 822 and male connectors (820, 821) appear on the male end 801 of the liquid ejector 800 of FIG. 8A, other configurations are envisioned, including, but not limited to, a configuration in which a first female port and female connectors appear on the male end of a liquid ejector. The liquid ejector 800 also includes a nozzle that includes a disc 880 and an apparatus 882 configured to activate the nozzle. The apparatus 882 can include a spring 881. The apparatus 882 is connected to the electrical conduit 860 via a cord 883 that traverses a first access port 885 of the utility lumen 850. The apparatus 882 also is connected to the pressurized air hose 870 via a connecting hose 884 that traverses a second access port 886 in the utility lumen 850. Although two access ports (885, 886) are present in the embodiment depicted at FIG. 8D, other embodiments are envisioned, such as utility lumens that include a single access port through which the cord 883 and connecting hose 884 pass.

The one or more liquid ejectors of the systems and kits provided herein generally may be constructed of any one or more materials. In some embodiments, a liquid ejector is constructed of a single material. In some embodiments, a liquid ejector is constructed of two or more different materials. For example, a first material may define the outer walls of a liquid ejector, while a second material may define at least a portion of a reservoir lumen and/or utility lumen. Non-limiting examples of materials of which the one or more liquid ejectors may be constructed include metal, wood, plastic, glass, or a combination thereof. In some embodiments, at least one of the one or more liquid injectors may be constructed at least partially of a transparent material, such as a transparent plastic, which may permit an amount of liquid in a system to be determined visually.

The one or more liquid ejectors may include a first end and a second end, and the first end and the second end may be configured as a male end and a female end, or vice versa. The male end and female end may permit (i) a duct to be connected to a liquid ejector via a male end and a female end, or (ii) a liquid ejector to be connected to a duct connector via a male end and a female end.

Liquid

A liquid used in the systems and methods provided herein generally may include any liquid that achieves a desired treatment of one or more surfaces. In some embodiments, the liquid includes an antimicrobial agent, a cleaning agent, or a combination thereof. In some embodiments, the liquid is an aqueous liquid that includes an antimicrobial agent, a cleaning agent, or a combination thereof. Examples of antimicrobial agents and compositions include, but are not limited to, those described in U.S. Pat. Nos. 8,075,936; 8,080,269; 8,586,115; and 8,962,662; and in U.S. Patent Application Publication Number 2016/0227775, each of which is incorporated by reference. Antimicrobial solutions can be used to treat surfaces against, for example, Gram-positive, Gram-negative, pathogenic, indicator, non-Gram test responsive bacteria, and/or spoilage bacteria, which are representative of a larger population including all bacteria that effect public health.

In some embodiments, the liquid includes a detergent. The detergent may include an ethoxylate-based detergent. The detergent may be a surfactant. The detergent may be a fatty acid salt.

Pressurized Gas

A pressurized gas may be disposed in a portion of the systems provided herein. In some embodiments, a pressurized gas is present in the hose configured to retain a pressurized gas. The pressurized gas may be supplied by a supply hose. The supply hose may be arranged in a gas inlet of a duct connector. The supply hose may be connected to a hose configured to retain a pressurized gas in any manner.

The supply hose may be connected to a supply of pressurized gas. The supply of pressurized gas generally may include any apparatus capable of delivering a gas under pressure. In some embodiments, the supply of pressurized gas is a component of a container, vehicle, etc., such as an on-board air compressor. The on-board air compressor may be a compressor used to power one or more other components of a vehicle, such as air brakes. In some embodiments, the supply of pressurized gas is not a component of a container or vehicle (i.e., it does not power one or more other components of a vehicle). A supply of pressurized gas, even if the supply is not a component of a container or vehicle, may be mounted—fixably or detachably—in a vehicle or container.

The pressurized gas may be present at a pressure in the systems provided herein that is effective to operate one or more components of the systems, such as the nozzle(s) of the one or more liquid ejectors. The pressurized gas may be present at the same pressure or different pressures throughout a system. For example, it is envisioned that a pressure gradient may exist in a system. A pressure imparted by the pressurized gas at a location at or near a supply hose connection may be greater than a pressure imparted at a location removed from the supply hose connection. Therefore, when a pressurized gas is explained as "impart[ing]" a particular pressure or range of pressures, the "impart[ed]" pressure is the pressure at which a supply gas is delivered to a system.

Generally, the pressurized gas may impart any pressure that is effective to operate one or more components of the systems, such as the nozzles of the one or more liquid ejectors. In some embodiments, the pressurized gas imparts a pressure of about 0.1 psi to about 100 psi, about 0.1 psi to about 75 psi, about 0.1 psi to about 50 psi, about 0.1 psi to about 40 psi, about 20 psi to about 40 psi, about 25 psi to about 35 psi, or about 30 psi.

The pressurized gas generally may include any one or more gasses that are capable of operating one or more components of the systems. In some embodiments, the pressurized gas includes air. In some embodiments, the pressurized gas includes nitrogen gas. In some embodiments, the pressurized gas includes argon.

Other Features

The systems and kits provided herein generally may include one or more additional features (e.g., components) that may facilitate any aspect of the systems, kits, and methods, including, but not limited to, the installation of the systems, maintenance of the systems, performance of a method, etc. The one or more additional features may be connected, controlled, or a combination thereof by one or more other components of the systems provided herein, such as an electrical conduit, power source, pressurized gas, computer processor, communication device, etc.

In some embodiments, the systems and kits include a filling port. A filling port may be present on any one or more of the components of a system or kit (e.g., one or more ducts, one or more duct connectors, and/or one or more liquid ejectors). The filling port may include an orifice that permits a liquid to be disposed in a reservoir lumen. A filling port may be sealed in any manner, such as by a plug. The plug may be tethered to a component of a system. In some embodiments, the filling port is accessible from outside a container. Such accessibility may be provided by a filling tube or funnel having a first end that is disposed in or attached to a filling port, and a second end that is accessible at a location removed from the filling port, such as a location outside a container in which a system is arranged. The second end of the tube or funnel may be sealed in any manner, such as by a plug.

In some embodiments, the systems and kits are configured to be filled with an amount of fluid that is sufficient to treat one or more surfaces more than once (e.g., 2 to 100 times, 2 to 75 times, 2 to 50 times, 10 to 50 times, 10 to 40 times, or 10 to 30 times). In some embodiments, the systems and kits are configured to be filled each time after one or more surfaces are treated. When the systems and kits are configured to be filled each time after one or more surfaces are treated, the systems may include a liquid tank that is in fluid communication with the system via a filling port or otherwise. The systems may include a pump or other apparatus configured to draw a desired amount of fluid into the systems (e.g., the reservoir lumens) after each treatment of one or more surfaces.

In some embodiments, the systems and kits include a gauge for determining an amount of liquid in a system. The gauge may be disposed in any component of the system. The gauge may be an analog gauge, a digital gauge, or a combination thereof. A gauge may be configured to forward data to a computer processor. The data, in turn, may be communicated via a communication device to a device (e.g., an input device, scanning device, etc.).

Any one or more components of the systems and kits provided herein may include a feature that facilitates the installation of the one or more components. For example, a duct may include an eyelet or bracket that is configured to accommodate a nail, screw, or other hardware. Although each component of a system may include a feature that facilitates the installation of the one or more components, only a portion of the components may include such a feature. For example, the ducts of a system may include such a feature, while the liquid ejectors may be held in place primarily or exclusively due to their connection to the ducts.

In some embodiments, the systems or kits provided herein include a proximity warning system alarm. The proximity warning system alarm may be configured to alert personnel while loading a container to prevent damage to the systems.

Containers

Generally, the systems provided herein may be arranged in any container. In some embodiments, the container is a trailer. In some embodiments, the container is a conex container.

The systems provided herein may be arranged in containers of any size. The modular nature of the components of the systems or kits can permit the arrangement of any number of liquid ejectors that is sufficient to treat the one or more surfaces of a container.

The one or more surfaces of a container that may be treated by the systems provided herein include walls, floors, ceilings, air chutes, doors, door seals, air vents, cooling system coils, and/or other surfaces that constitute a container's structure. A container may include one or more ledges or other unique structural features, and one or more surfaces of the one or more ledges or other structural features also may be treated by the systems provided herein.

In some embodiments, the systems provided herein are configured to dispense about 0.3 mL to about 0.5 mL of liquid per square foot of the one or more surfaces. In some embodiments, the systems provided herein are configured to dispense about 0.35 mL to about 0.4 mL of liquid per square foot of the one or more surfaces. In some embodiments, the systems provided herein are configured to dispense about 0.385 mL of liquid per square foot of the one or more surfaces. All or a portion of the liquid dispensed may contact the one or more surfaces.

In some embodiments, the container is a refrigerated container.

Machine-Readable Identifier

The systems and kits provided herein may include a machine-readable identifier. In some embodiments, the machine-readable identifier is a bar code, but the machine-readable identifier generally may be any identifier that is readable by a scanning device or an input device.

As used herein, the phrase "scanning device" refers to a device that may read a machine-readable identifier, and receive a communication from a communication device, cloud-based service, etc. As used herein, the phrase "input device" refers to a device that may read a machine-readable identifier, receive a communication from a communication device, and allow a user to input an information, which may be communicated to and/or stored by a computer processor, cloud-based service, etc.

In some embodiments, the machine-readable identifier comprises an adhesive backing. In some embodiments, the machine-readable identifier is affixed to an external surface of a container, thereby permitting a user to scan the machine-readable identifier without entering a container, without opening a door or doors of a container, and/or while sitting in a vehicle, such as a truck, that is connected to a container.

Kits or Parts

Kits of parts are provided herein, and the kits generally may include one or more components of the systems provided herein.

In some embodiments, the kits of parts include one or more ducts; one or more liquid ejectors; and one or more duct connectors.

In some embodiments, the kits of parts include one or more ducts; one or more liquid ejectors; one or more duct connectors, and a computer processor.

In some embodiments, the kits of parts include one or more ducts; one or more liquid ejectors; one or more duct connectors, a computer processor, and a communication device.

In some embodiments, the kits of parts include one or more ducts; one or more liquid ejectors; one or more duct connectors, a computer processor, and a communication device.

In some embodiments, the kits of parts include one or more ducts; one or more liquid ejectors; one or more duct connectors, a computer processor, a communication device, and a power source.

Any one or more parts of the kits provided herein may be combined into a single part. For example, a component may be disposed in another component, such as one or more of a computer processor, a power source, and a communication device may be disposed in a duct connector. As a further example, a single device may serve as more than one component. A single device, in some embodiments, is a computer processor and communication device.

In some embodiments, the kits also include an input device or scanning device.

In some embodiments, the kits include a machine-readable identifier, such as a bar code. When the kits include a machine-readable identifier, the kits also may include a scanning device or input device that is capable of reading the machine-readable identifier.

In some embodiments, the kits include one or more components that may facilitate the installation of the systems, the maintenance of the systems, performance of a method, etc. For example, a kit may include a set of instructions. The instructions may be directed to the installation of a system, the maintenance of the system, the operation of a system, etc. In some embodiments, the kit includes one or more apparatuses (e.g., brackets, screws, etc.) that facilitate the installation of the systems.

The kits provided herein may be packaged in any known manner, and may include any number of the individual components. For example, a kit may include one duct connector, at least two liquid ejectors, and at least two ducts.

The kits also may include components that are configured to be arranged at an end of a system. For example, a duct or liquid injector may include a port and/or connections only on one end. The end may be a "right hand" end or a "left hand" end. Additionally or alternatively, a kit may include one or more pieces (e.g., plugs) that may be used to prevent or reduce leakage of a liquid and/or pressurized gas from a component arranged at an end of a system.

Methods

Provided herein are methods of treating one or more surfaces. Any of the systems or kits provided herein may be used to perform the methods.

In some embodiments, the methods include providing a system provided herein. The system may be arranged in a container. In some embodiments, the methods include providing a system herein, and activating the nozzle(s) of the one or more liquid ejectors to eject at least a portion of a liquid onto at least a portion of one or more surfaces of a container. The activating of the nozzle(s) may include activating the nozzles with a signal (e.g., a charge) from an electrical conduit, a pressurized gas, or a combination thereof.

In some embodiments, a computer processor activates the nozzle(s). The computer processor may be instructed by a user with an input device. The input device may be used to send instructions to a computer processor. The communication between the input device and the computer processor may be facilitated by a communication device. Therefore, a user may activate the nozzle(s) of the one or more liquid ejectors by providing instructions with the input device to the communication device, which forwards the instructions to the computer processor. The computer processor may then activate the nozzle(s), such as with a signal from an electrical conduit, a pressurized gas, or a combination thereof.

In some embodiments, the methods include querying the status of a system prior to the activating of the nozzle(s) of the one or more liquid ejectors. The querying may include receiving with an input device or scanning device (i) a communication from the communication device regarding a status of the system, (ii) a communication from a cloud-based service, or (iii) a combination thereof.

As used herein, the phrase "status of a system", "status of the system", "system status", and the like generally refer to any information about the system, including the components of the system, the maintenance of the system, the operational history of the system, the operational history of the container in which the system is arranged, etc. In some embodiments, the status of the system includes the date and/or time of a previous activating of the nozzle(s) of the one or more liquid ejectors, an indication of an amount of liquid in the system, an indication of a remaining power of the power source, or a combination thereof.

In some embodiments, the methods provided herein include reading a machine-readable identifier with a scanning device or input device. The reading of a machine-readable identifier with an input device may permit a user to assign to the system an information that is inputted with the input device. The information may be communicated to and stored by the computer processor, the cloud-based service, or a combination thereof. For example, a user may input an information regarding the system into an input device, and scan the machine-readable identifier to assign the information to the system that is associated with the machine-readable identifier. The scanning and inputting of the information may occur in any order. As a further example, a user may dispose a certain amount of liquid into a system on a particular date, and the user may enter this information into the input device and scan the machine-readable identifier to correlate the information with the system as the information is communicated to the computer processor or cloud-based service. As yet another example, a user may treat the one or more surfaces of a container, and upon scanning the machine-readable identifier, the date and/or time of the treating of the one or more surfaces may be communicated to and stored by the computer processor or cloud-based service.

The reading of a machine-readable identifier with a scanning device or input device may permit a user to query the status of a system. The status of the system may permit a user to determine whether the one or more surfaces of the container require treatment with the system. Upon scanning the machine-readable identifier, the status of the system may be communicated to the scanning device or an input device. The status may be communicated by the computer processor via the communication device, the cloud-based service, or a combination thereof. As an example, the computer processor or cloud-based service may store data pertaining to the operational history of the system and/or the container in which the system is arranged; therefore, a user, prior to loading a container, may scan the machine-readable identifier so that the status of the system is communicated to the scanning device or input device.

In some embodiments, the input device has a touch-screen display exhibiting one or more of the following selections: "Treatment Complete", "Container Loaded", "Container Unloaded", and "Status". In some embodiments, the scanning device has a touch-screen display exhibiting a "Status" selection. Other terms may be used to describe these selections. When these selections are chosen before, during, or after scanning a machine-readable identifier associated with a system, the following information may be communicated to and/or from the input device, or to the scanning device.

| Selection | |
|---|---|
| | Information Communicated to a Computer Processor and/or Cloud-Based Service |
| "Treatment Complete" | A date and/or time of the treatment of the one or more surfaces of the container, which may be manually entered into the device; or a date and/or time of the scanning of the machine-readable identifier performed contemporaneously with the treatment of the one or more surfaces of the container. |
| "Container Loaded" | A date and/or time of the loading of the container, which may be manually entered into the device; or a date and/or time of the scanning of the machine-readable identifier performed contemporaneously with the loading of the container. |
| "Container Unloaded" | A date and/or time of the unloading of the container, which may be manually entered into the device; or a date and/or time of the scanning of the machine-readable identifier performed contemporaneously with the uloading of the container. |
| | Information Communicated to a Device from a Computer and/or Cloud-Based Service |
| "Status" | An operational history of the container, the system, or a combination thereof, wherein the operational history includes the last stored action (i.e., a treatment of the one or more surfaces, a loading of the container, or an unloading of the container), or a listing of two or more of the last stored actions. |

Although a user may input information regarding the operational history of a system and/or container, the operational history, in some embodiments, may be automatically communicated and/or stored by the systems provided herein. For example, a computer processor may be configured to automatically store the date, time, and any other information regarding each treatment of one or more surfaces.

In the descriptions provided herein, the terms "includes," "is," "containing," "having," and "comprises" are used in an open-ended fashion, and thus should be interpreted to mean "including, but not limited to." When methods, systems, or kits are claimed or described in terms of "comprising" or "including" various elements or features, the methods, systems, or kits can also "consist essentially of" or "consist of" the various components or features, unless stated otherwise.

The terms "a," "an," and "the" are intended to include plural alternatives, e.g., at least one. For instance, the disclosure of "a nozzle," "a liquid," "a duct", and the like, is meant to encompass one, or mixtures or combinations of more than one nozzle, liquid, duct, and the like, unless otherwise specified.

Various numerical ranges may be disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. Moreover, numerical end points of ranges disclosed herein are approximate. As a representative example, Applicant discloses that, in some embodiments, a pressurized gas has a pressure of about 25 psi to about 35 psi. This disclosure should be interpreted as encompassing values of about 25 psi to about 35 psi, and further encompasses "about" each of 26 psi, 27 psi, 28 psi, 29 psi, 30 psi, 31 psi, 32 psi, 33 psi, and 34 psi, including any ranges and sub-ranges between any of these values.

Terms such as "reduce" or other forms of the word, such as "reducing" or "reduction," are indicative of a lowering of an event or characteristic (e.g., microorganism growth, viability, or survival). It is understood that this is typically in relation to some standard or expected value, in other words it is relative, but that it is not always necessary for the standard or relative value to be referred to. For example, "reduce microbes such as bacteria" means lowering the amount of microbes relative to a standard or a control. Terms such as "prevent" or other forms of the word, such as "preventing" or "prevention," are indicative of effectively stopping a particular event or characteristic, to stabilize or delay the development or progression of a particular event or characteristic, or to minimize the chances that a particular event or characteristic will occur. Prevent does not require comparison to a control as it is typically unqualified as compared to, for example, "reduce". As used herein, something could be reduced but not prevented, but something that is reduced could also be prevented. Likewise, something could be prevented but not reduced, but something that is prevented could also be reduced. It is understood that where reduce or prevent are used, unless specifically indicated otherwise, the use of the other word is also expressly disclosed.

Terms such as "treat" or other forms of the word, such as "treated" or "treatment," are intended to mean to administer a composition or to perform a method in order to reduce, prevent, inhibit, break-down, or eliminate a particular characteristic or event (e.g., microorganism growth, viability, or survival), such as the methods disclosed herein. It is generally understood that treating involves contacting a liquid composition such as an antimicrobial composition with a surface, for example, as disclosed herein.

The present embodiments are illustrated herein by referring to various embodiments, which are not to be construed in any way as imposing limitations upon the scope thereof. On the contrary, it is to be understood that resort may be had to various other aspects, embodiments, modifications, and equivalents thereof which, after reading the description herein, may suggest themselves to one of ordinary skill in the art without departing from the spirit of the present embodiments or the scope of the appended claims. Thus, other aspects of the embodiments will be apparent to those skilled in the art from consideration of the specification and practice of the embodiments disclosed herein.

I claim:

1. A container comprising a system for treating one or more surfaces of the container, the system comprising: one or more ducts comprising (i) a reservoir lumen, and (ii) a utility lumen; wherein the reservoir lumen is configured to retain a liquid, and the reservoir lumen comprises a first port configured to permit the liquid to enter or exit the reservoir lumen, and a second port configured to permit the liquid to enter or exit the reservoir lumen; wherein the utility lumen is configured to house at least one of (1) an electrical conduit, or (2) a hose configured to retain a pressurized gas; and one or more liquid ejectors comprising (a) a housing, and (b) a nozzle arranged in the housing, wherein the nozzle is configured to eject at least a portion of the liquid onto at least a portion of the one or more surfaces in response to a signal from the electrical conduit, a pressure provided by the pressurized gas, or a combination thereof; wherein the housing of the one or more liquid ejectors comprises a third port configured to permit the liquid to enter or exit the housing, and a fourth port configured to permit the liquid to enter or exit the housing, wherein the housing is in fluid communication with the one or more ducts via a connection between the first port and the fourth port, and a connection between the second port and the third port; wherein (A) at least one of the one or more ducts, (B) at least one of the one or more liquid ejectors, or (C) at least one of the one or more ducts and at least one of the one or more liquid ejectors is affixed to or embedded, partially or completely, in a ceiling or a wall of the container, and remains affixed to or embedded, partially or completely, in the ceiling or the wall of the container during use of the container.

2. A system for treating one or more surfaces of a container, the system comprising:

- one or more ducts comprising (i) a reservoir lumen, and (ii) a utility lumen;
- wherein the reservoir lumen is configured to retain a liquid, and the reservoir lumen comprises a first port configured to permit the liquid to enter or exit the reservoir lumen, and a second port configured to permit the liquid to enter or exit the reservoir lumen;
- wherein the utility lumen is configured to house at least one of (1) an electrical conduit, or (2) a hose configured to retain a pressurized gas; and
- one or more liquid ejectors comprising (a) a housing, and (b) a nozzle arranged in the housing, wherein the nozzle is configured to eject at least a portion of the liquid onto at least a portion of the one or more surfaces in response to a signal from the electrical conduit, a pressure provided by the pressurized gas, or a combination thereof;
- wherein the housing of the one or more liquid ejectors comprises a third port configured to permit the liquid to enter or exit the housing, and a fourth port configured to permit the liquid to enter or exit the housing, wherein the housing is in fluid communication with the one or more ducts via a connection between the first port and the fourth port, and a connection between the second port and the third port;
- wherein (A) at least one of the one or more ducts, (B) at least one of the one or more liquid ejectors, or (C) at least one of the one or more ducts and at least one of the one or more liquid ejectors is affixed to or embedded, partially or completely, in a ceiling or a wall of the container, and remains affixed to or embedded, partially or completely, in the ceiling or the wall of the container during use of the container.

3. The system of claim 2, wherein the one or more ducts further comprise a male end and a female end, wherein the male end comprises the first port, and the female end comprises the second port, and wherein the one or more liquid ejectors comprise a male end and a female end, wherein the male end comprises the third port, and the female end comprises the fourth port.

4. The system of claim 2, wherein the liquid comprises an antimicrobial agent, a cleaning agent, or a combination thereof.

5. The system of claim 2, wherein the reservoir lumen of the one or more ducts have a total volume sufficient to retain an amount of the liquid sufficient to treat the one or more surfaces 2 times to 100 times.

6. The system of claim 2, further comprising a liquid tank in which the liquid is disposed, wherein the liquid tank is in fluid communication with the reservoir lumen(s) of the one or more ducts.

7. The system of claim 2, wherein the nozzle of the one or more liquid ejectors is configured to eject the liquid in the form of droplets, the droplets having an average droplet size of about 30 microns to about 50 microns.

8. The system of claim 2, wherein at least one of the one or more ducts and at least one of the one or more liquid ejectors are affixed to the ceiling or the wall of the container, and remain affixed to the ceiling or the wall of the container during use of the container.

9. The system of claim 2, further comprising a duct connector, the duct connector comprising:

- (i) a reservoir configured to retain the liquid;
- (ii) a gas inlet configured to permit the introduction of the pressurized gas to the system; and
- (iii) a fifth port and a sixth port, each configured to permit the liquid to enter or exit the reservoir;
- wherein the duct connector is in fluid communication with (a) two of the one or more ducts via a connection between the first port of a first duct and the sixth port, and a connection between the second port of a second duct and the fifth port, (b) two of the one or more liquid ejectors via a connection between the third port of a first liquid ejector and the sixth port, and a connection between the fourth port of a second liquid ejector and the fifth port, (c) the first duct and the second liquid ejector via a connection between the first port of the first duct and the sixth port, and a connection between the fourth port of the second liquid ejector and the fifth port, or (d) the second duct and the first liquid ejector via a connection between the second port of the second duct and the fifth port, and a connection between the third port of a first liquid ejector and the sixth port.

10. The system of claim 9, further comprising a supply hose arranged in the gas inlet, wherein the supply hose is connected to a supply of pressurized gas, and configured to introduce the pressurized gas into the system.

11. The system of claim 9, wherein the duct connector comprises a male end and a female end, and the male end comprises the fifth port, and the female end comprises the sixth port.

12. The system of claim 9, wherein at least one of the one or more ducts, the one or more liquid ejectors, or the duct connector further comprises a filling port.

13. The system of claim 12, further comprising a filling tube, the filling tube having a first end that is disposed in or attached to the filling port, and a second end that is accessible at a location removed from the filling port.

14. The system of claim 9, wherein the system further comprises:

- a computer processor, and
- a communication device;
- wherein the computer processor is configured to (i) activate the nozzle of the one or more liquid ejectors with the signal, the pressure, or a combination thereof to eject at least a portion of the liquid onto at least a portion of the one or more surfaces, (ii) receive and/or store data regarding a status of the system, or (iii) a combination thereof, and
- wherein the communication device is configured to (i) receive instructions from an input device, (ii) provide instructions to the computer processor, (iii) communicate the status of the system to the input device, (iv) communicate the status of the system to a cloud-based service, or (v) a combination thereof.

15. The system of claim 14, further comprising a power source, wherein the power source is configured to supply power to the electrical conduit, the communication device, the computer processor, or a combination thereof.

16. The system of claim 14, further comprising a machine-readable identifier.

17. The system of claim 16, wherein at least one of the communication device or the cloud-based service is configured to communicate the status of the system to a scanning device or input device that is capable of reading the machine-readable identifier.

* * * * *